United States Patent Office 3,412,093
Patented Nov. 19, 1968

3,412,093
NEW ADENINE DERIVATIVES AND METHOD
FOR THEIR PREPARATION
Ctirad Podesva and Kitty Vagi, Montreal, Quebec, Canada, assignors to Delmar Chemicals Limited
No Drawing. Filed Dec. 15, 1966, Ser. No. 601,863
Claims priority, application Canada, Dec. 21, 1965, 948,370
19 Claims. (Cl. 260—252)

ABSTRACT OF THE DISCLOSURE

Adenine is reacted in an organic solvent with a β-dialkylaminopropiophenone or a salt thereof to obtain an adenine derivative substituted on the nitrogen at position 9 with a 3-phenyl-3-oxopropyl group or a derivative thereof wherein the phenyl group is substituted by groups such as, halogens, methyl, methoxy or nitro and/or the propyl group is substituted on the central carbon atom by lower alkyl. The corresponding 3-hydroxy-propyl derivatives are also prepared by reduction. The products are useful as fungistats and as intermediates.

BACKGROUND OF THE INVENTION

This invention relates to novel derivatives of adenine. More particularly, it relates to heretofore unknown adenine derivatives characterized by substitution of $N_9$ of a 3-phenyl-3-oxopropyl group or derivative thereof. It also relates to a new method for producing the said adenine derivatives.

SUMMARY OF THE INVENTION

An object of the present invention is to provide new and useful derivatives of adenine. Another object is to provide a method for the preparation of the said new derivatives of adenine.

The compounds of the present invention are represented by general structural Formula I:

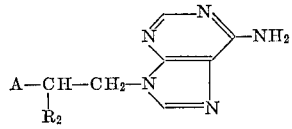

in which A represents

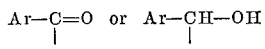

wherein Ar represents an unsubstituted phenyl group or a mono-, di- or trisubstituted phenyl group, said substituents being of the same nature and being selected from the group consisting of halogen, methyl, methoxy and nitro groups, and $R_2$ represents hydrogen, a methyl group or an ethyl group.

The 3-oxopropyl derivatives of the invention are obtained in good yields by reacting adenine, also called 6-aminopurine, with a β-dialkylaminopropiophenone or a salt thereof, represented by general Formula II:

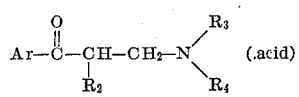

in which Ar and $R_2$ have the same meaning as in general Formula I and $R_3$ and $R_4$ represent a lower alkyl group, preferably methyl or ethyl. This novel reaction is carried out in a medium of an organic solvent, preferably polar, concentrated or diluted, or in a mixture of solvents in which both reacting components are at least partially soluble, preferably at higher temperatures e.g. at reflux temperature of the solvent. It is to be understood that whereas the reaction takes places even at room temperature, its rate is too slow to be economical and higher temperatures are therefore preferred. Under these conditions of higher temperatures, the reaction is generally completed in periods of time ranging from one to a few hours. The reaction products usually separate during the reaction in the form of white crystals of good purity and are easily isolated, e.g. by filtration. Further purification, if necessary, is performed by recrystallizing the product from an appropriate solvent.

As stated above, the solvent chosen for the reaction should be the one in which both components are at least partially soluble at the reaction temperature. A complete solubility is not essential and often the reaction can be carried out in suspension. Alcohols or alcohol-water mixtures are choice solvents.

The starting materials should preferably be used 1:1 on a molar basis. Whereas an excess of one or the other component does not prevent the reaction from taking place, the isolation of the reaction product is facilitated if equimolecular amounts are used. The amounts of solvent used, while not critical, should preferably be such that the combined starting materials form 10–30% by weight of the reaction mixture.

The position of substitution in the products disclosed in the present invention has been established on the basis of ultraviolet and infrared spectra. It was unexpected and surprising to find that the substitution did not take place on the 6-amino group like e.g. in the case of 2,6-diamino-4-phenyl-5-methylpyrimidine and other similar cyclic amidines.

The corresponding alcohols are obtained by reducing the respective ketones in a known manner, e.g. with sodium borohydride in a lower alkanol.

The compounds of the present invention were found to have fungistatic properties when tested on molds like *Aspergillus niger* or *Penicillum spinulosum* and, as such, can be used industrially, for example, as disinfectants. They are also useful as such or, after further chemical modification, in other fields due to the fact that they contain a physiologically highly active moiety and also a chemically flexible conjugated keto group. For example 9-(3'-phenyl-3' - oxo - 2'-methylpropyl)-adenine produced a strong depressive action on the central nervous system when administered to mice by i.p. injection even at doses as low as 0.3 mg./kg. A similar effect was observed when 9-(3'-phenyl-3'-hydroxypropyl)-adenine, obtained by reduction of the corresponding ketone, was applied to mice under similar conditions. The ketones therefore also represent important chemical intermediates.

DESCRIPTION OF PREFERRED EMBODIMENTS

The following examples are illustrative only of our invention and should not be construed as limiting its scope.

Example 1

A mixture of 2.7 g. of adenine and 4.8 g. of β-diethylaminopropiophenone hydrochloride in 20 ml. of 50% aqueous ethanol was heated under reflux overnight. After cooling to room temperature, the white crystalline precipitate was separated by filtration and purified by crystallization from Cellosolve (Cellosolve is a trademark for mono- and di-alkyl ethers of ethylene glycol). The pure product, 9-(3'-phenyl-3'-oxopropyl)-adenine, melted at 256–7° C.

*Analysis.*—Calculated for $C_{14}H_{13}N_5O$: C, 62.91; H, 4.90; N, 26.21%. Found: C, 63.34; H, 5.19; N, 26.00%. The same product was obtained when β-diethylaminopropiophenone base was used instead of the hydrochloride.

Example 2

A mixture of 2.7 g. of adenine and 5.1 g. of β-diethyl-amino-α-methylpropiophenone hydrochloride in 20 ml. of 50% aqueous ethanol was kept under reflux overnight. After cooling to room temperature and dilution with water, the crystalline mixture of adenine and of the reaction product was collected by filtration and dried. The dry mixture was suspended in 75 ml. of chloroform and the chloroform insoluble, unreacted adenine was removed by filtration. The filtrate was evaporated in vacuo and the crystalline residue purified by crystallization from methanol-ethyl acetate mixture. The product, 9-(3'-phenyl3'-oxo-2'-methylpropyl)-adenine, had a M.P. of 189–90° C.

*Analysis.*—Calculated for $H_{15}H_{15}N_5O$: C, 64.03; H, 5.38; N, 24.90%. Found: C, 64.27; H, 5.22; N, 24.60%.

Example 3

A mixture of 1.35 g. of adenine and 2.76 g. of β-diethyl-amino-p-chloropropiophenone hydrochloride in 25 ml. of 50% aqueous ethanol was heated under reflux for 2 hours. The oily reaction product was separated and cooled to room temperature whereby it solidified. The product, β-(9-adenyl)-p-chloropropiophenone, was purified by crystallization from methanol-ethyl acetate to a M.P. of 222–4° C.

*Analysis.*—Calculated for $C_{14}H_{12}ClN_5O$: C, 55.73; H, 4.01; Cl, 11.75; N, 23.22%. Found: C, 56.15; H, 4.38; Cl, 11.48; N, 23.22%.

Example 4

A mixture of 1.35 g. of adenine and 2.55 g. of β-diethylamino-p-methylpropiophenone hydrochloride in 25 ml. of 50% aqueous ethanol was kept under reflux for 2 hours. After cooling to room temperature, the reaction mixture was diluted with water and extracted with chloroform. The solvent was evaporated under reduced pressure and the residue induced to crystallization by treatment with hot methanol. The product, β-(9-adenyl)-p-methyl-propiophenone, was purified by recrystallization from methanol, M.P. 247–8° C.

*Analysis.*—Calculated for $C_{15}H_{15}N_5O$: C, 64.03; H, 5.38; N, 24.90%. Found: C, 64.39; H, 5.81; N, 25.15%.

Example 5

A mixture of 1.35 g. of adenine and 2.72 g. of β-diethylamino-p-methoxypropiophenone hydrochloride in 25 ml. of 50% aqueous ethanol was heated under reflux for one hour. After cooling to room temperature the reaction mixture was diluted with water and extracted with chloroform. The chloroform extract was concentrated to a small volume, the precipitated product collected by filtration and purified by recrystallization from Cellosolve-hexane. The product, β-(9-adenyl)-p-methoxypropiophenone, had a M.P. 192–4° C.

*Analysis.*—Calculated for $C_{15}H_{15}N_5O_2$: C, 60.59; H, 5.09; N, 23.56%. Found: C, 60.79; H, 5.03; N, 23.67%.

Example 6

The same product as in Example 5 was obtained when β-dimethylamino-p-methoxypropiophenone hydrochloride was used instead of β-diethylamino-p-methoxypropiophenone.

Example 7

A mixture of 1.35 g. of adenine and 2.86 g. of β-diethylamino-p-nitropropiophenone hydrochloride in 25 ml. of 50% aqueous ethanol was refluxed for one hour. After cooling to room temperature the precipitated product, β-(9-adenyl)-p-nitropropiophenone, was collected by filtration and purified by crystallization from Cellosolve-hexane. M.P. 224–5° C.

*Analysis.*—Calculated for $C_{14}H_{12}N_6O_3$: C, 53.84; H, 3.87%. Found: C, 53.31; H, 4.23%.

Example 8

A mixture of 2.25 g. of adenine and 5.5 g. of β-diethylamino-3',4',5'-trimethoxypropiophenone hydrochloride in 50 ml. of 50% aqueous ethanol was kept under reflux for 2.5 hours. The product, 9-[3'-(3'',4'',5'''-trimethoxyphenyl)-3'-oxopropyl]-adenine, which precipitated in crystalline form on cooling of the reaction mixture was collected by filtration and was purified by crystallization from isopropanol to a M.P. of 212–3° C.

*Analysis.*—Calculated for $C_{17}H_{19}N_5O_4$: C, 57.13; H, 5.36; N, 19.60%. Found: C, 57.11; H, 5.11; N, 19.40%.

Example 9

A mixture of 1 g. of 9-(3'-phenyl-3'-oxopropyl)-adenine and 0.2 g. of sodium borohydride in 50 ml. of isopropanol containing 5 ml. of water was stirred for 48 hours at room temperature. After dilution with water the product was extracted into chloroform, the solvent removed by distillation in vacuo and the residue purified by crystallization from methanol-ethyl acetate mixture. The pure 9-(3'-phenyl-3'-hydroxypropyl)-adenine had a M.P. of 140–142° C.

*Analysis.*—Calculated for $C_{14}H_{15}N_5O$: C, 62.44; H, 5.62; N, 26.01%. Found: C, 62.18; H, 5.86; N, 26.24%.

Example 10

A mixture of 4 g. of 9-(3'-phenyl-3'-oxo-2'-methylpropyl)-adenine and 0.3 g. of sodium borohydride in 60 ml. of isopropanol containing 6 ml. of water was stirred overnight at room temperature. The product was isolated in the same way as in Example 9 and purified by crystallization from methanol-ethyl acetate mixture. The pure 9-(3'-phenyl-3'-hydroxy-2'-methylpropyl)-adenine had a M.P. of 229–31° C.

*Analysis.*—Calculated for $C_{15}H_{17}N_5O$: C, 63.58; H, 6.05; N, 24.72%. Found: C, 63.76; H, 6.47; N, 24.56%

We claim:
1. Adenine derivatives represented by the general formula:

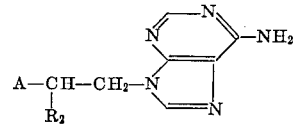

in which A represents

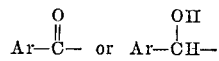

wherein Ar represents an unsubstituted phenyl group or a mono-, di- or trisubstituted phenyl group, said substituents being of the same nature and being selected from the group consisting of halogen, methyl, methoxy and nitro groups, and $R_2$ represents hydrogen, a methyl group or an ethyl group.

2. Adenine derivatives as defined in claim 1, in which Ar represents a phenyl group monosubstituted in position para.

3. Adenine derivatives as defined in claim 2, wherein said halogen is chlorine.

4. 9-(3'-phenyl-3'-oxopropyl)-adenine represented by the structural formula:

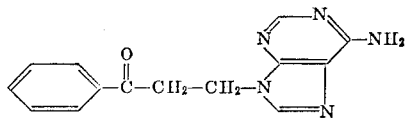

5. 9-(3'-phenyl-3'-oxo-2'-methylpropyl)-adenine represented by structural formula:

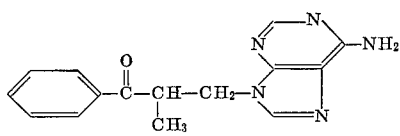

6. β-(9-adenyl)-p-chloropropiophenone represented by structural formula:

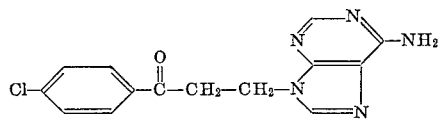

7. β-(9-adenyl)-p-methylpropiophenone represented by structural formula:

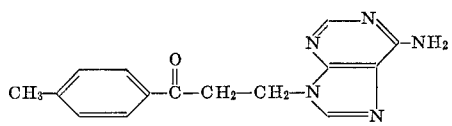

8. β-(9-adenyl)-p-methoxypropiophenone represented by structural formula:

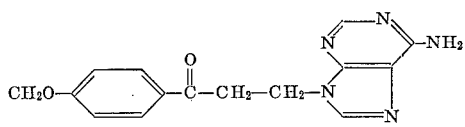

9. β-(9-adenyl)-p-nitropropiophenone represented by structural formula:

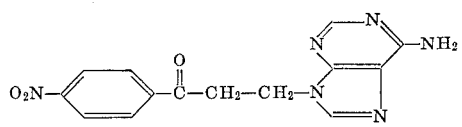

10. 9-[3'(3'',4'',5'' - trimethoxyphenyl)-3'-oxopropyl]-adenine represented by the structural formula:

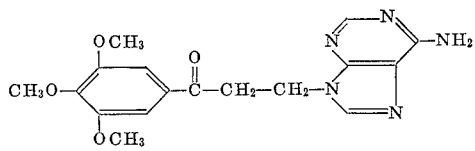

11. 9-(3'-phenyl-3'-hydoxypropyl)-adenine represented by the structural formula:

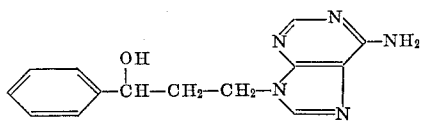

12. 9-(3'-phenyl-3'-hydroxy-2'-methylpropyl) - adenine represented by the structural formula:

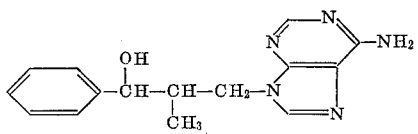

13. A process for the production of an adenine derivative represented by the structural formula:

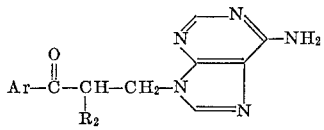

wherein Ar represents an unsubstituted phenyl group or a mono-, di- or trisubstituted phenyl group, said substitutes being of the same nature and being selected from the group consisting of halogen, methyl, methoxy, and nitro groups, and $R_2$ represents hydrogen, a methyl group or an ethyl group, which comprises reacting β-dialkyl-aminopropiophenone, represented by the general formula:

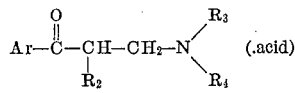

wherein Ar and $R_2$ are as defined above, and $R_3$ and $R_4$ represent a lower alkyl group or a salt thereof, with adenine in a medium of an organic solvent in which both starting materials are at least partially soluble, and recovering said derivative from the reaction products thus obtained.

14. A process as defined in claim 13, wherein Ar represents an unsubstituted phenyl group or a phenyl group substituted in position para by a substituent selected from the group consisting of a halogen, a methyl group, a methoxy group and a nitro group.

15. A process as defined in claim 14, wherein said halogen is chlorine.

16. A process as defined in claim 13, wherein said solvent is a polar organic solvent.

17. A process as defined in claim 13, wherein said solvent comprises a lower aliphatic alcohol.

18. A process as defined in claim 13, wherein said reaction is effected at a temperature from room temperature to reflux temperature.

19. A process as defined in claim 13, wherein said reactants are used in equimolecular proportion.

References Cited

UNITED STATES PATENTS 3,016,378   1/1962   Roch _____ 260—254

NICHOLAS S. RIZZO, *Primary Examiner.*

A. M. TIGHE, *Assistant Examiner.*